(12) United States Patent
Ciobanu

(10) Patent No.: US 12,526,252 B2
(45) Date of Patent: Jan. 13, 2026

(54) ELECTRONIC MESSAGE CONTENT INTERCEPTING SYSTEM

(71) Applicant: YOOCHOOZ APPS PTY LTD, Marangaroo (AU)

(72) Inventor: Margaret Ciobanu, Marangaroo (AU)

(73) Assignee: YOOCHOOZ APPS PTY LTD, Marangaroo (AU)

(*) Notice: Subject to any disclaimer, the term of this patent is extended or adjusted under 35 U.S.C. 154(b) by 0 days.

(21) Appl. No.: 18/705,093

(22) PCT Filed: Oct. 26, 2022

(86) PCT No.: PCT/AU2022/051281
§ 371 (c)(1),
(2) Date: Apr. 26, 2024

(87) PCT Pub. No.: WO2023/070151
PCT Pub. Date: May 4, 2023

(65) Prior Publication Data
US 2024/0430222 A1    Dec. 26, 2024

(30) Foreign Application Priority Data
Oct. 26, 2021  (AU) ................. 2021903410

(51) Int. Cl.
*G06F 15/16* (2006.01)
*G06F 40/279* (2020.01)
(Continued)

(52) U.S. Cl.
CPC .......... *H04L 51/212* (2022.05); *G06F 40/279* (2020.01); *H04L 51/04* (2013.01); *H04M 3/42382* (2013.01)

(58) Field of Classification Search
CPC ..... H04L 51/212; H04L 51/04; G06F 40/279; G06F 40/30; G06F 2221/2149;
(Continued)

(56) References Cited

U.S. PATENT DOCUMENTS 8,787,876 B1    7/2014  Cazanas et al.
11,488,165 B1*  11/2022  Adam ................. G06Q 20/3221
(Continued)

OTHER PUBLICATIONS

International Search Report & Written Opinion dated Dec. 16, 2022 from Application No. PCT/AU2022/051281, 29 pp.

*Primary Examiner* — John B Walsh
(74) *Attorney, Agent, or Firm* — INNOVATION CAPITAL LAW GROUP, LLP; Vic Lin

(57) ABSTRACT

An electronic message content intercepting system has a virtual keyboard installed by an operating system of a supervised mobile communication device which is configured to process keypresses for software applications executed by the supervised mobile communication device. The system is configured to analyse message text input via the keyboard to identify categorised text strings which may be categorised as inappropriate, offensive, abusive and/or the like. Responsive to the disapproval input the system does not process input of the categorised text string so that the categorised text string is not transmitted to a recipient mobile communication device. However, responsive to the approval input, the system is configured to process input of the categorised text string so that the categorised text string is transmitted to the recipient mobile communication device and the text string is also transmitted to the supervisory mobile communication device for display as an alert.

26 Claims, 10 Drawing Sheets

(51) Int. Cl.
*H04L 51/04* (2022.01)
*H04L 51/212* (2022.01)
*H04M 3/42* (2006.01)

(58) Field of Classification Search
CPC .......... H04M 3/42382; H04M 3/2281; H04M 3/436; H04M 3/42; G06Q 10/107; G06Q 10/10

See application file for complete search history.

(56) References Cited

U.S. PATENT DOCUMENTS

| | | |
|---|---|---|
| 2016/0042165 A1* | 2/2016 | Nicholson .......... G06V 30/1423 726/19 |
| 2016/0098392 A1 | 4/2016 | Clarke et al. |
| 2016/0294755 A1 | 10/2016 | Prabhu |
| 2017/0149795 A1 | 5/2017 | Day |
| 2017/0332240 A1 | 11/2017 | Raleigh |
| 2019/0266444 A1 | 8/2019 | Ryan, Jr. et al. |
| 2021/0203771 A1 | 7/2021 | Innocenti et al. |

\* cited by examiner

ELECTRONIC MESSAGE CONTENT INTERCEPTING SYSTEM

FIELD OF THE INVENTION

This invention relates generally to content filtering and moderation systems.

BACKGROUND OF THE INVENTION

Parental controls systems may be installed on computers and mobile devices to allow parents to restrict the access of content by their children which may be inappropriate for their age.

Parental controls include content filters which limit access to age-inappropriate content, usage controls which constrain the usage by implementing time-limits or forbidding certain types of usage, computer usage management tools which enforce the use of certain software and monitoring which tracks activity when using the devices.

The demand for parental control monitoring methods has increased due to the rising availability of the Internet to tackle cyberbullying. Studies have shown that about 75% of adolescents have been subjected to cyberbullying and psychologically, cyberbullying could be more harmful to the victim than traditional bullying.

The present invention seeks to provide a type of content monitoring system which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein an electronic message content intercepting system comprising a virtual keyboard installed by an operating system of a supervised mobile communication device. The virtual keyboard is configured to process keypresses for software applications executed by the supervised mobile communication device.

The virtual keyboard can be installed on common types of mobile communication devices, including those running the Android™ and iPhone™ platforms to allow interoperability with practically any software application without requiring integration or modification of these software applications.

The supervised mobile communication device is associated with a supervisory mobile communication device, such as that of a parent.

The system is configured to analyse message text input via the keyboard to identify categorised text strings which may be categorised as inappropriate, offensive, abusive and/or the like.

Unlike conventional content filters which filter out inappropriate content, the present supervised mobile communication device is rather configured to intercept text messages by displaying a user interface prompt when detecting such a categorised text string. The user interface prompt has approval and disapproval inputs.

Responsive to the disapproval input the system does not process input of the categorised text string so that the categorised text string is not transmitted to a recipient mobile communication device.

However, responsive to the approval input, the system is configured to process input of the categorised text string so that the categorised text string is transmitted to the recipient mobile communication device in the usual manner. The system also transmits the categorised text string to the supervisory mobile communication device for display as an alert.

As such, the supervisory mobile communication device may receive and display alerts of messages containing categorised text strings sent by supervised mobile communication devices associated therewith.

The supervisory mobile communication device may further handle sending of messages in relation to these alerts to the supervised mobile communication device or other supervisory mobile communication devices associated with recipient mobile communication devices of the electronic message.

The system may employ recipient mobile communication identifiers (such as mobile phone numbers, email addresses or the like) to ascertain any other supervisory user account associated with the recipient mobile communication device. As such, a user of the supervisory mobile communication device may communicate with such other supervisory user account in relation to alerts without requiring contact details therefor.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
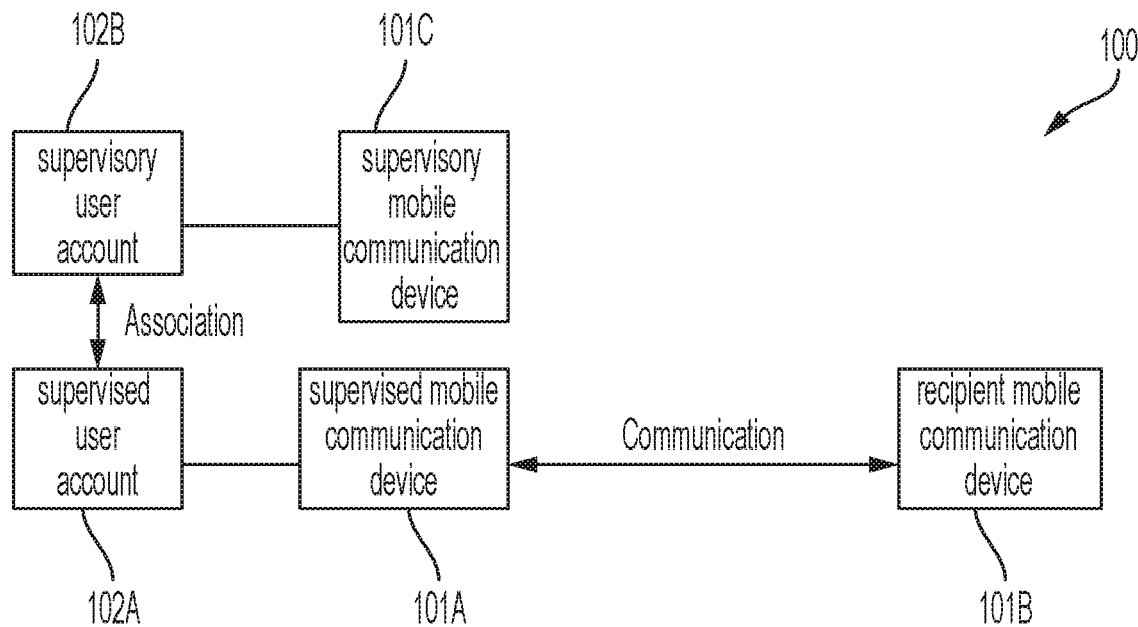
FIG. 1 shows interactions of mobile communication devices and associated user accounts of an electronic message content intercepting system.

FIG. 1 shows an electronic message content intercepting system 100 involving a plurality of mobile communication devices 101.

Figure 2:
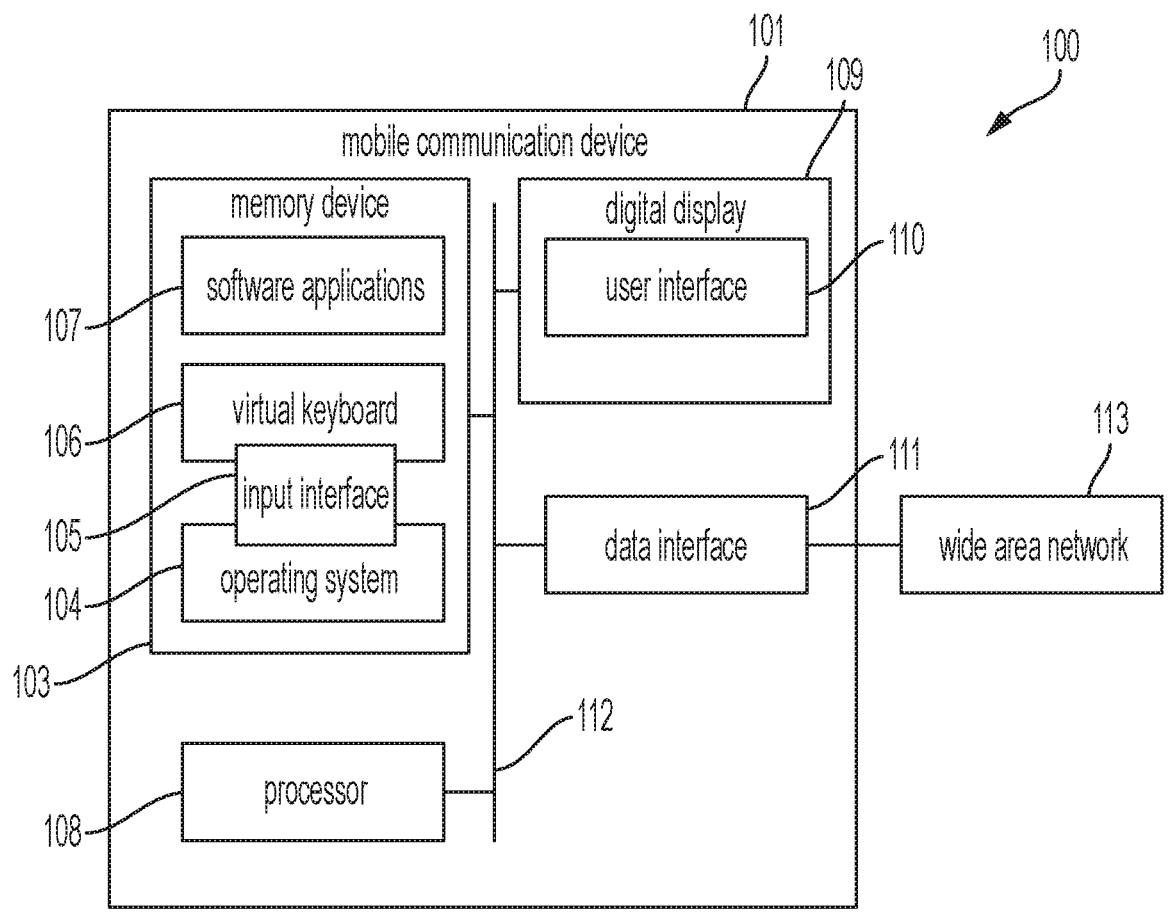
FIG. 2 shows a mobile communication device of the system in further detail.

As is shown in FIGS. 1 and 2, a supervised mobile communication device 101A may be in communication with a recipient mobile communication device 101B via a social media or communication platform 114, such as Facebook™, Instagram™ WhatsApp™ and or the like.

The supervised mobile communication device 101 is associated with a supervised user account 102A. The system 100 further comprises a supervisory mobile communication device 101c associated with an associated user account 102B. As is shown in FIG. 1, the supervised user account 102A and the supervisory user account 102B are associated.

The recipient mobile communication device 101B may further be associated with its own supervisory mobile communication device 101C.

FIG. 2 shows the mobile communication device 101 in further detail. The mobile communication device 101 comprises a processor 108 for processing digital data. A memory device 103 in operable communication with the processor 108 via a system bus 112 is configured for storing digital data including computer program code instructions. In use, the processor 108 fetches these computer program code instructions and associated data for interpretation and execution of the functionality described herein.

The memory 103 may store an operating system 104 which is bootstrapped to allow the mobile communication device 101 to operate a number of software applications 107, including those for communication via social media or communication platforms 114.

The operating system 104 may expose an input interface 105 for installation of a virtual keyboard 106.

The virtual keyboard 106 is installed by the operating system 104 of the supervised mobile communication device 101A to process keypresses for the software applications 107 executed by the mobile communication device. As the virtual keyboard 106 is installed as the default input device, the operating system 104 would display the virtual keyboard 106 for processing input for any of the software applications 107.

The mobile communication device 101 may comprise a data interface 111 for sending and receiving data via a wide area network 113, such as the Internet.

The mobile communication device 101 may further comprise a digital display 109 which may display a user interface 110 thereon. The digital display 109 may have a haptic overlay to receive user input gestures in relation to digital information displayed by the user interface 110.

Figure 3:
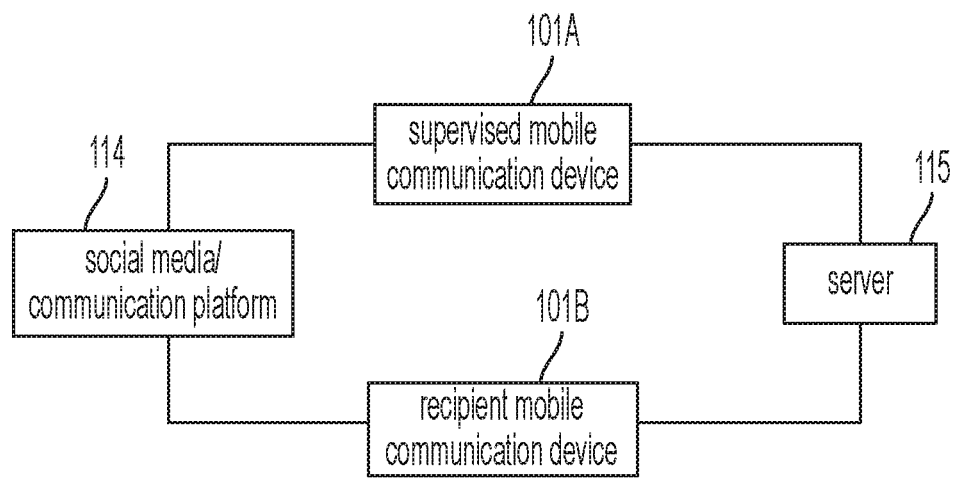
FIG. 3 shows communication of mobile communication devices via social media and/or communication platforms.
Figure 4:
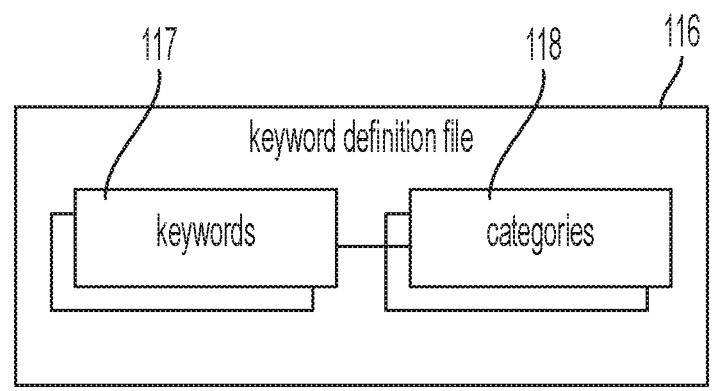
FIG. 4 shows an exemplary keyword definition file.

FIG. 3 shows the supervised mobile communication device 101A communicating with a recipient mobile communication device 101B using a social media or communication platform 114.

FIG. 3 further shows wherein the mobile communication devices 101 may be in operable communication with a server 115.

Figure 5:
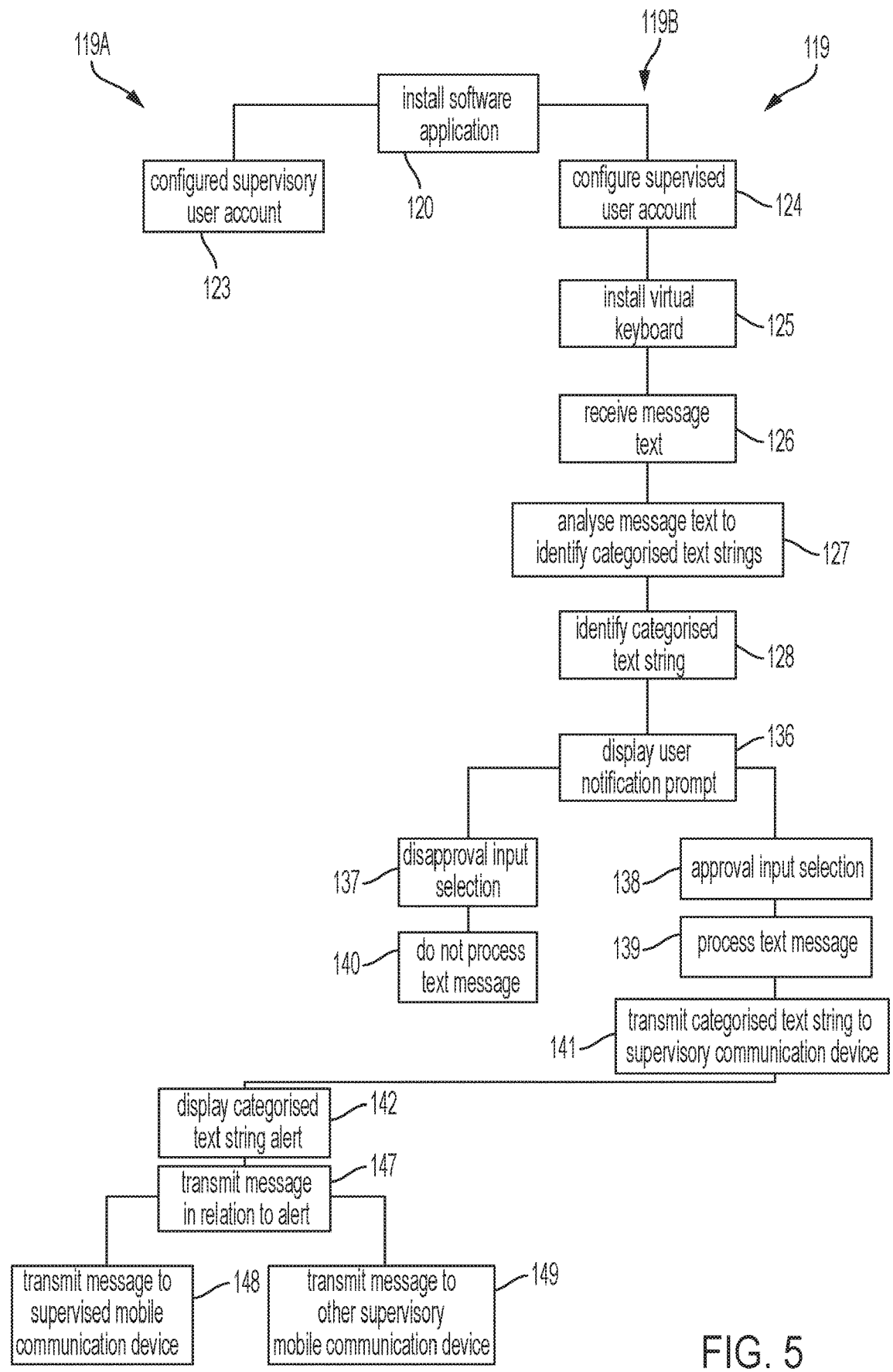
FIG. 5 shows exemplary processing by the system.

FIG. 5 shows exemplary processing 119 by the system 100 in accordance with an embodiment.

Step 120 comprises installation of a software application on the supervised mobile communication device 101A and the supervisory mobile communication device 101C. With reference to FIG. 3, the software application may be downloaded from the server 115, application store or the like for installation within the memory 103 of the mobile communication device 101. The software application may install the virtual keyboard 106.

Figure 6:
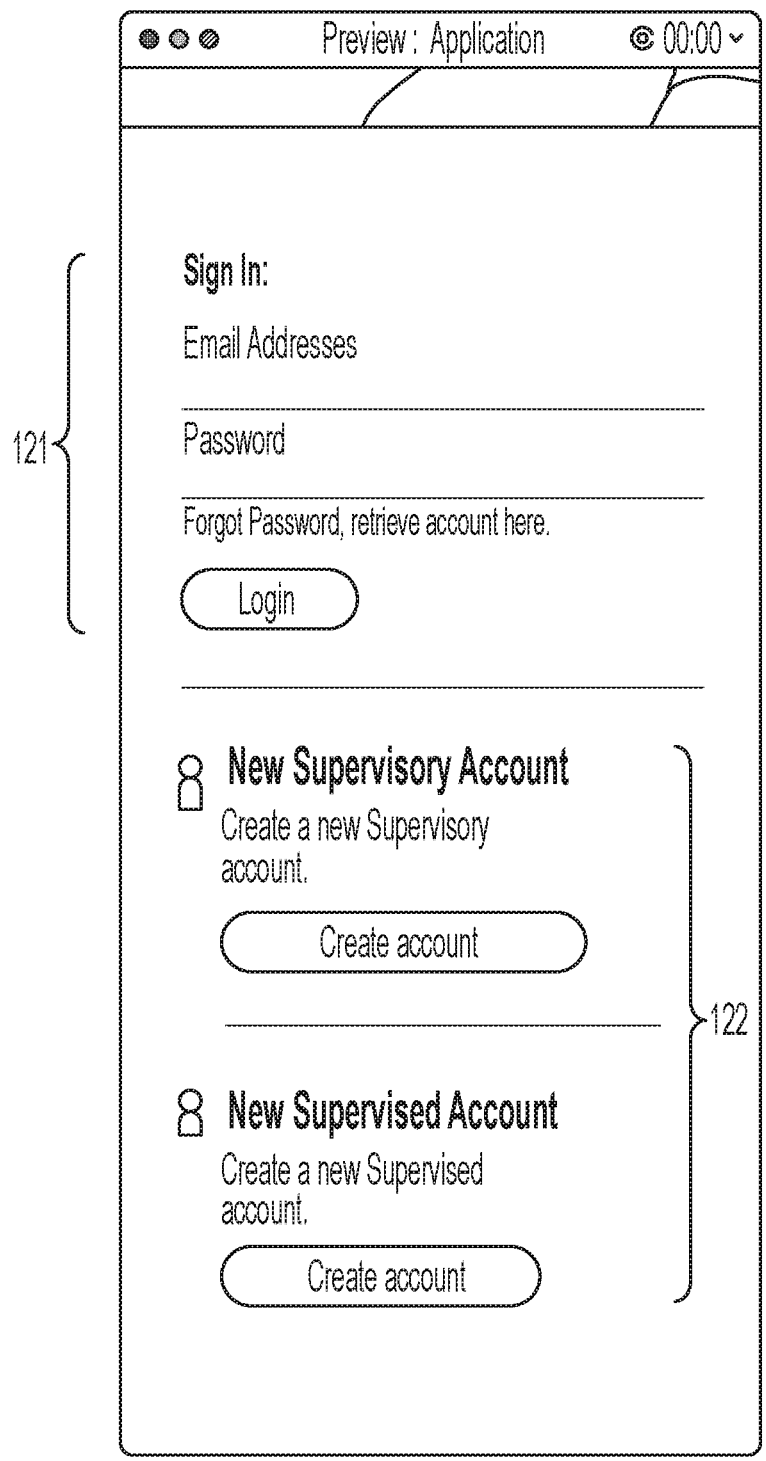
FIG. 6 shows a mobile communication device user interface for configuring supervisory or supervised user accounts.

FIG. 6 shows a user registration user interface wherein a user may input authentication credentials 121 and provides a selection 122 to choose from a new supervisory account 102B at step 123 or a new supervised account 102A at step 124.

FIG. 5 shows exemplary supervisory processing 119A mainly performed the supervisory mobile communication device 101C and exemplary supervised processing 119B mainly performed by the supervised mobile communication device 101A.

If creating a supervised account 102A, the software application installs the virtual keyboard 106 on the supervised mobile communication device 101A at step 125.

Figure 8:
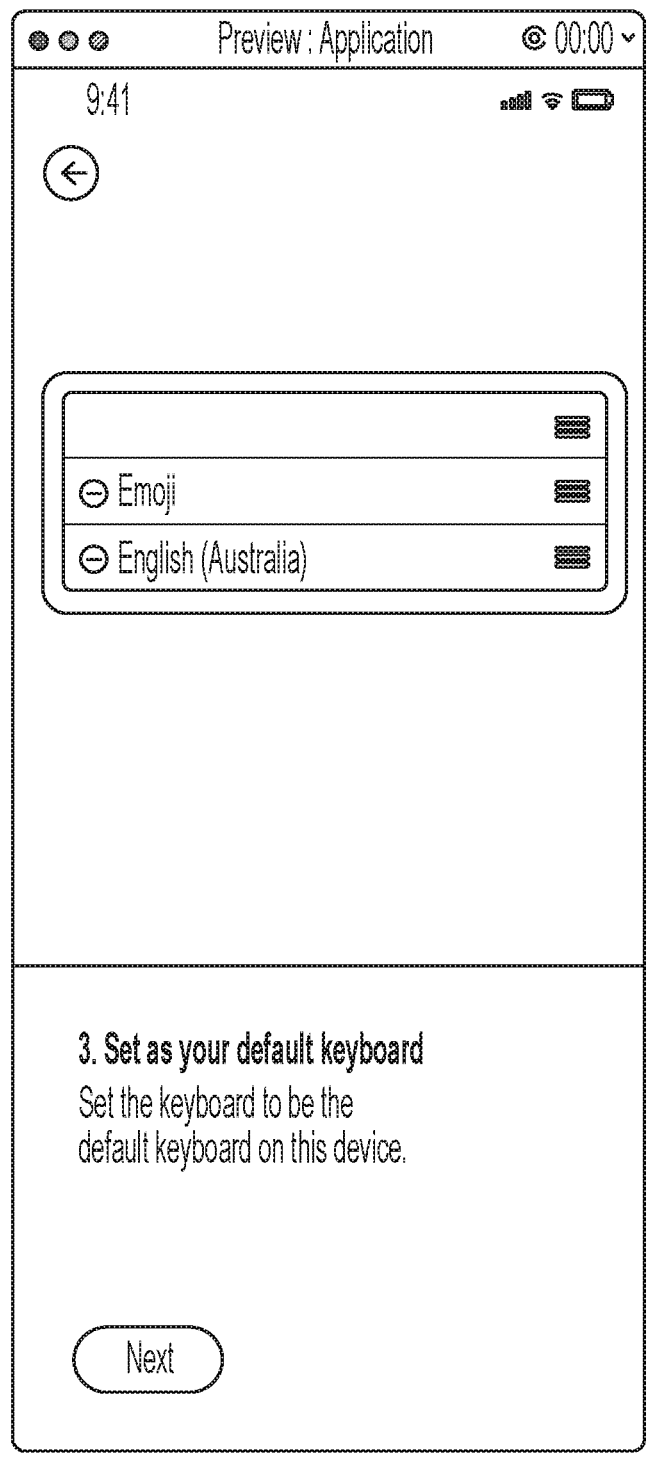
FIG. 8 shows a supervised mobile communication device interface installing a virtual keyboard.

FIG. 8 shows a user interface 110 for configuring the default keyboard for the operating system 104 of the supervised mobile communication device 108 to use the virtual keyboard 106.

Figure 7:
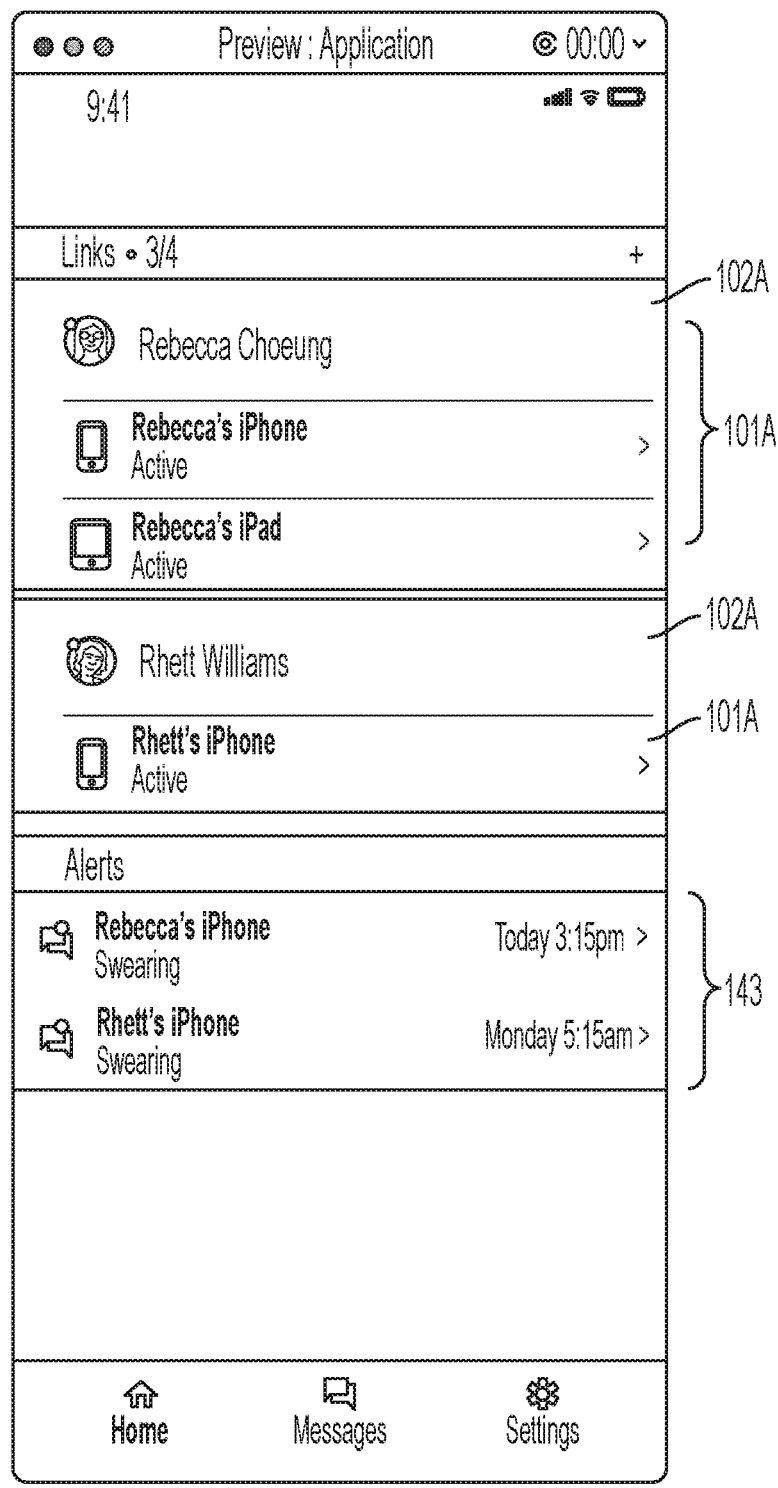
FIG. 7 shows a supervisory mobile communication device user interface displaying associated user accounts and mobile communication devices associated with each user account.

FIG. 7 shows an interface 110 displayed by the supervisory mobile communication device 101C which shows a number of supervised user accounts 102A and the supervised mobile communication devices 101A associated with each supervised user account 102A.

Figure 9:
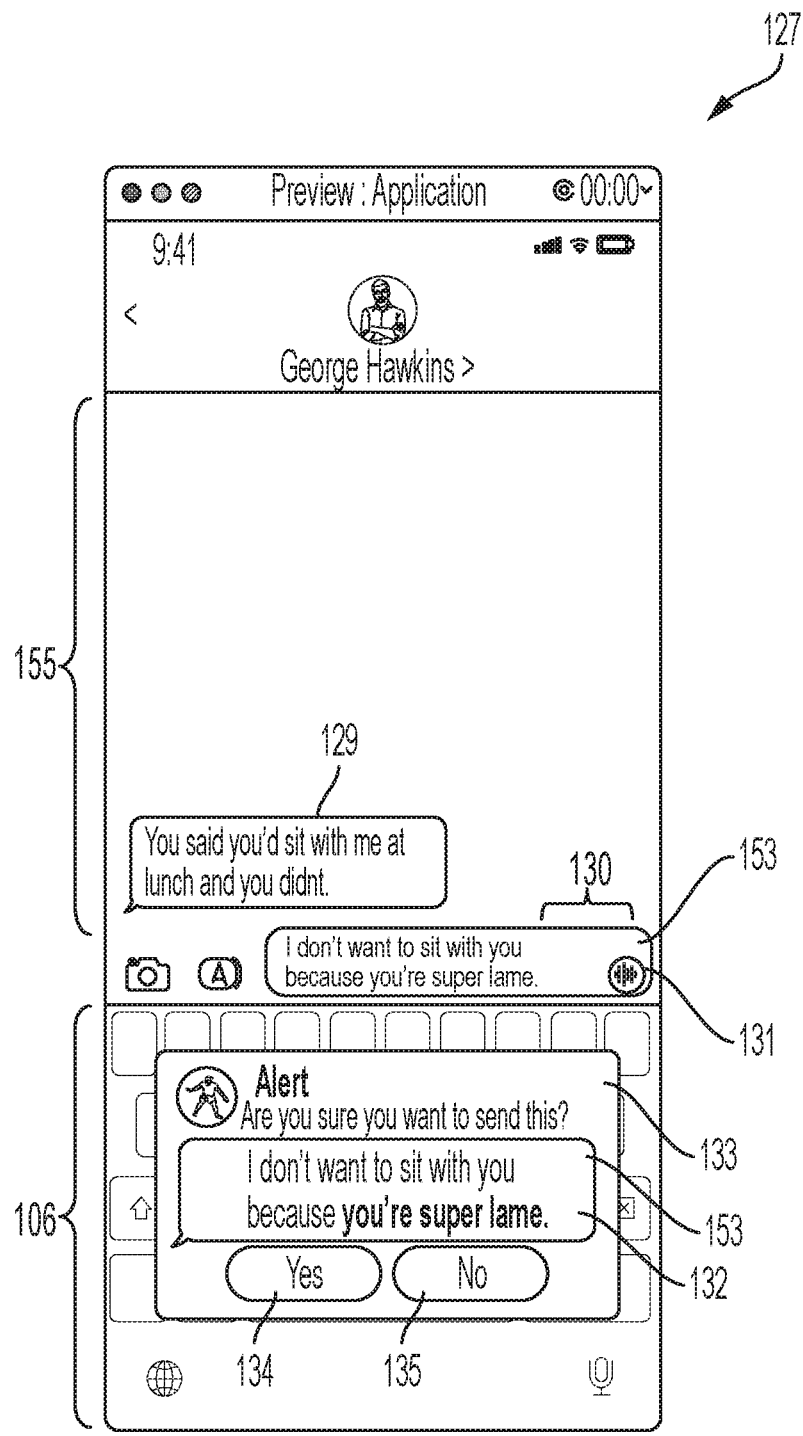
FIG. 9 shows an exemplary communication interface displayed by the supervised mobile communication device.

FIG. 9 shows an exemplary messaging interface 154 displayed by one of the software applications 107 of the supervised mobile communication device 101A. The interface 154 comprises a message history section 155 comprising a plurality of messages 129 in reverse chronological order and a text input field 130 for the input of message text 153. The text input field 130 may have an associated send button 131 for transmission of the message text 153 to the recipient mobile communication device 101B.

The interface 154 comprises the virtual keyboard 106 which is typically displayed beneath the message history section 155.

When initiating messaging, the system 100 may be configured for automatically inputting and transmitting an initial message. For example, the virtual keyboard 106 may be configured for detecting the opening of the messaging interface and inputting and transmitting the initial message, such as the message indicating that the messaging of the interface is being monitored by the system 100. As such, the user of the recipient mobile communication device 10B would receive an automated message that the messaging is being monitored.

In embodiments, the system 100 may be configured for requesting verification information from the recipient mobile communication device 101B. In embodiments, the system may be configured for requesting a self-take photograph ("selfie") from the user of the recipient mobile communication device 101B. Specifically, where the recipient mobile communication device 101B also has the virtual keyboard 106 installed thereon, the virtual keyboard 106 may request access to a camera of the recipient mobile communication device 101B to capture an image which is transmitted to the supervised mobile communication device 101A.

The system 100 may be configured to inhibit transmission of messages without receipt of the requested image data. In embodiments, the system 100 may employ facial recognition techniques to verify that receives image data comprises a facial image therein.

Step 126 comprises the supervised mobile communication device 101A receiving message text 153 via the text input 130 as the user presses keys of the virtual keyboard 106.

At step 127, the system 100 analyses the message text input via the keyboard 106 to identify categorised text strings. Categorised text strings may comprise strings of text which are categorised as containing swear words, or being inappropriate, offensive, abusive and or the like.

FIG. 7 shows an exemplary keyword definition file 116 comprising a plurality of keywords 117 stored in relation to a plurality of categories 118. In an embodiment, the system 100 uses keyword matching to identify the categorised text strings from the message text. The keywords 117 may comprise a dictionary of swear words, or keywords configured as inappropriate, offensive and the like. The keyboards 117 may comprise wildcard character keywords 117 used to identify variable categorised text strings.

The keyword definition file 116 may be installed within the memory 103 of the supervised mobile communication device 101A for rapid categorised text and identification without having to query the server 115.

However, periodically, the supervised mobile communication device 101A may receive updated keyword definition files 116 from the server 115.

In embodiments, keywords 117 may be input into the supervisory mobile communication device 101C which are used to update the keyword definition file 116. Specifically, a user of the supervisory mobile communication device 101 may enter one or more keywords which are transmitted to the server 115, which updates the keyword definition file 116 to a new version and then transmits the updated definition file 116 to the supervised mobile communication device 101A. In embodiments, message text is transmitted by the system 100 to the supervisory mobile communication device 101C for display and configuration of keywords. More specifically, the user of the supervisory mobile communication device 101C may be able to browse message text history of the supervised mobile communication device 101A and select keywords therefrom which are added to the definition file 116. For example, the user may highlight words on screen within the message text which are added as keywords by the system 100 to the definition file 116.

In alternative embodiments, the system 100 may use more sophisticated techniques for identifying categorised keywords, including artificial intelligence and semantic analysis techniques. These more computationally intensive processes may be performed by the server 115.

In embodiments, the supervised mobile communication device 101A may perform less computationally intensive computational matching but also transmit the message text to the server 115 for more computationally intensive sophisticated artificial intelligence analysis. In this way, the supervised mobile communication device 101A is able to quickly identify keyword matched categorised text strings whereas the server 115 may be able to identify categorised text strings and more sophisticated beyond keyword matching.

Ideally, the system 100 should be configured for identifying categorised text strings in less than a second so as to be able to text messages before they are transmitted. In embodiments, the system 100 may be configured for inhibiting transmission of text messages (including by inhibiting the sending button 131 of the interface) until such time that analysis has been performed, including analysis performed by the supervisory mobile communication device 101A and, in embodiments, the server 115.

At step 128, the system 100 identifies a categorised text string 132. With reference to the example shown in FIG. 9, the categorised text string 132 comprises "you're super lame".

The supervised mobile communication device 101A then displays a user interface notification prompt 133 at step 136 as shown in FIG. 9. The prompt 133 may query whether the user wishes to send the message text 153 and may include the message text 153 and the identified categorised text string 132 shown highlighted.

The prompt 133 may comprise an approval input 134 and the disapproval input 135.

If the user selects the disapproval input 135 at step 137, the message text 153 is not transmitted to the recipient mobile communication device 101B at step 140.

The virtual keyboard 106 may be configured to delete the message text or the categorised text string. The virtual keyboard 106 may count the number of characters of the message text or the characterised text string and virtually operate a backspace button input of the keyboard to delete the message text or the categorised text string from the message text input field 130. In this way, the virtual keyboard 106 need not otherwise interact with the current software application 107.

In alternative embodiments, the virtual keyboard 106 may buffer the message text in a buffer and may further display a virtual text input 130 displaying text within the buffer. If the user selects the disapproval input 135, the virtual keyboard 106 may expunge the message text and/or the categorised text string from the buffer.

However, if the user selects the approval input 134 at step 138, the supervised mobile communication device 101A processes input so that the message text 153 (including the categorised text string 132) is transmitted to the recipient mobile communication device 101B at step 139.

Where the virtual keyboard 106 buffers the message text within the buffer, the buffer may be flushed so that the message text 153 and/or the categorised text string 132 is output into the interface of the software application 107. Use of the buffer allows the virtual keyboard to pre-process the message text 153 prior interactions thereof with the software application 107, including preventing the software application 107 transmitting keyboard activity indications ('e.g. Jane is typing . . . ').

Furthermore, if the user selects the approval input 134 at step 138, the categorised text string 132 is transmitted to the supervisory mobile communication device 101C at step 141 and which is displayed by the user interface 110 thereof as an alert at step 142.

FIG. 7 shows the user interface 110 displayed by the supervisory mobile communication device 101C comprising a plurality of alerts 143.

Figure 10:
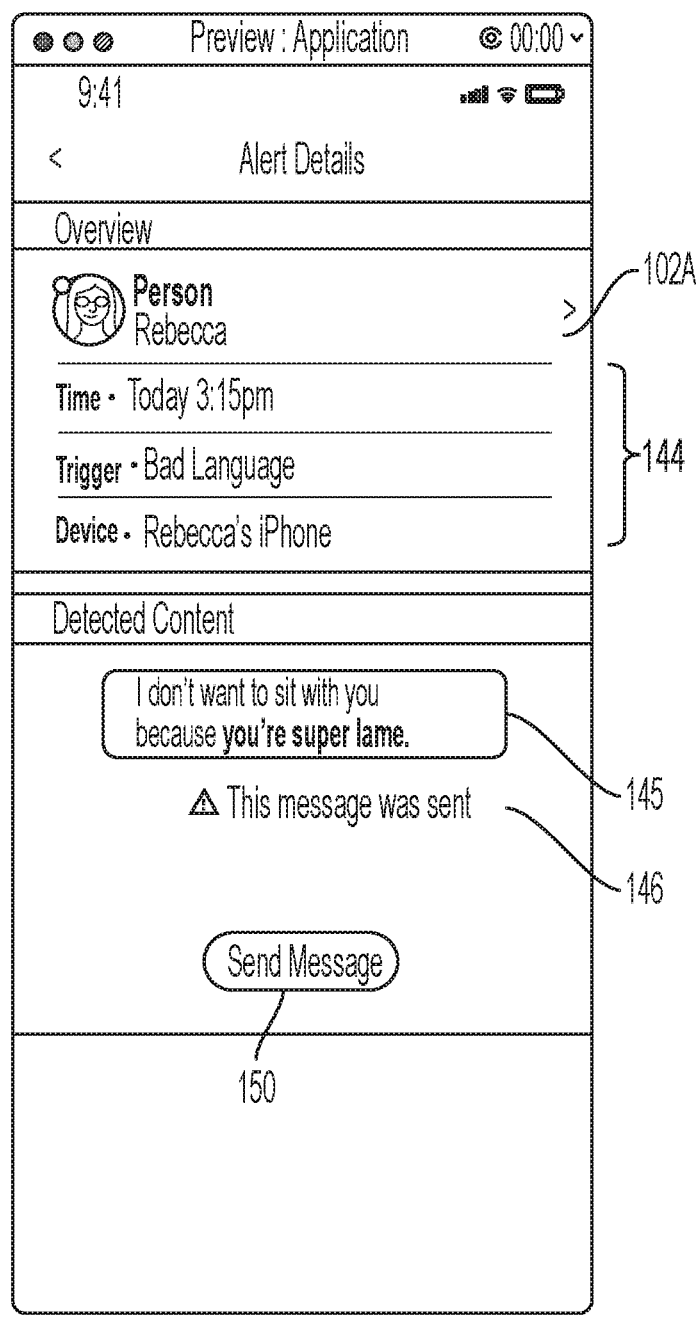
FIG. 10 shows an exemplary alert notification displayed by the supervisory mobile communication device.

Selection of one of the alerts 143 may cause the supervisory mobile communication device 101C to display the user interface 110 shown in FIG. 10. This user interface 110 may show the associated supervised user account 102A and date, time and device information.

The alert 143 may further show the message text 145 including the categorised text string 132. The interface may further have an indication 146 at the message has been sent to the recipient mobile communication device 101B.

The interface may further comprise an input to send a message in relation to the alert 143 at step 147.

Figure 11:
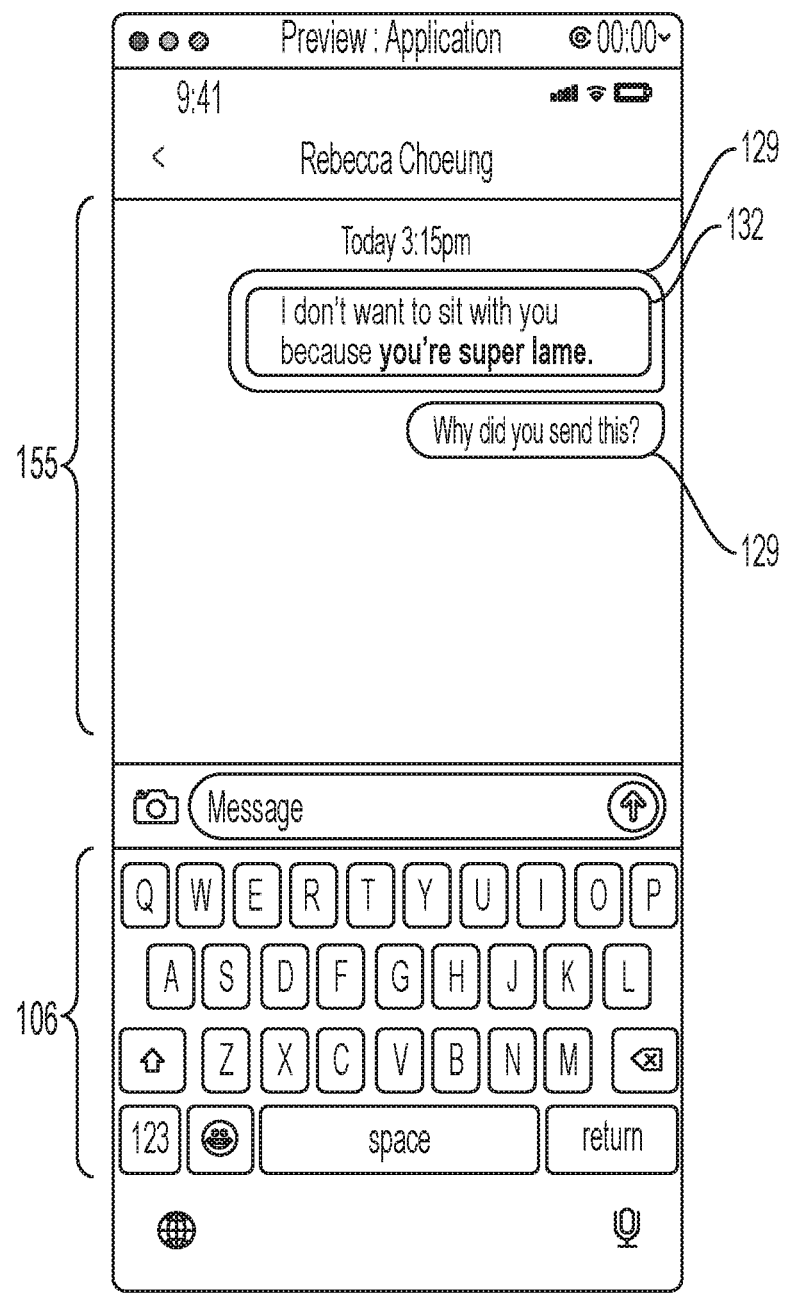
FIG. 11 shows a further communication interface displayed displaying messages sent between the supervisory mobile communication device and the supervised mobile communication device in relation to an alert.

FIG. 11 shows sending of a message in relation to the alert 143 to the supervised mobile communication device 101A at step 148. As is shown in FIG. 11, the message history section 129 may display a message 129 comprising the flagged message text 153 and/or the categorised text string 132. The user of the supervisory mobile communication device 101C may further include other text messages 129.

The user of the supervised mobile communication device 101A may then respond to the message(s).

The system 100 may be configured for transmitting these messages natively within the installed software application of the system 100. Alternatively, the system 100 may be configured for transmitting these messages using the same software application 107 used to transmit the flagged message 129. For example, for a message flagged within the WhatsApp™ messenger software application 107, the system 100 may transmit the message in relation to the alert using the WhatsApp™ messenger software application 107.

Alternatively, at step 149, the user of the supervisory mobile communication device 101C may transmit a message to a supervisory mobile communication device 101C associated with the recipient mobile communication device 101B. The system 100 may be configured to identify a recipient of the message (such as by mobile phone number, social media account handle, email address or the like) and query a database of the server 115 to identify whether there is an associated supervisory user account 102B. If such an associated supervisory account 102B is identified, the system 100 may allow the transmission of a message associated with the alert to the supervisory mobile communication device 101C associated with the recipient mobile communication device 101B.

Figure 12:
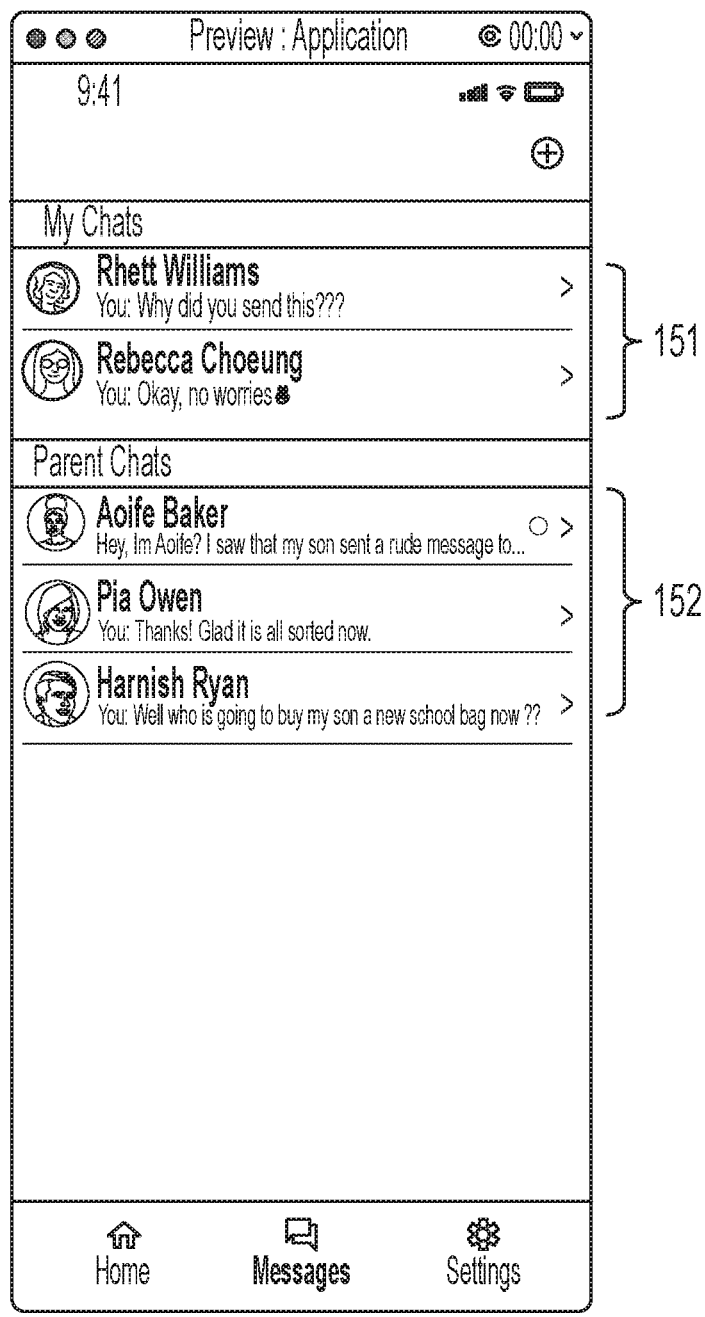
FIG. 12 shows an exemplary message history user interface displayed by the supervised mobile communication device displaying messages sent in relation to alerts.

FIG. 12 shows a message history display interface displayed by the supervisory mobile communication device 101C which has a history 151 of messages transmitted to associated supervised mobile communication devices 101A and history 152 of messages transmitted to supervised mobile communication devices 101A associated with the recipient mobile communication device 101B.

In embodiments, the virtual keyboard 106 may be used to transmit audio and/or video file attachments. Furthermore, the virtual keyboard 106 may be configured for analysing the audio content thereof using speech-to-text recognition and then processing the recognised text a similar manner as manner described above to intercept the transmission of the attachment, including transmitting the audio and/or video file attachment to the supervisory mobile communication device 101C.

In embodiments, the operation of the virtual keyboard 106 may be disabled during certain time periods. For example, the user of the supervisory mobile communication device 101C may configure settings specifying a time period during the day during which time the keyboard 106 is disabled.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. An electronic message content intercepting system comprising:
    a virtual keyboard installed by an operating system of a supervised mobile communication device to process keypresses for a plurality of software applications executed by the supervised mobile communication device,
    wherein the supervised mobile communication device is associated with a supervised user account and wherein the system further comprises a supervisory mobile communication device associated with a supervisory user account, and the supervised user account is associated with the supervisory user account, wherein the system is configured to:
    analyse message text input via the keyboard to identify categorised text strings,
    display a user interface notification prompt when identifying a categorised text string, the prompt having approval and disapproval inputs; and
    responsive to the disapproval input: not process input of the categorised text string so that the categorised text string is not transmitted to a recipient mobile communication device; or
    responsive to the approval input:
        process input of the categorised text string so that the categorised text string is transmitted to the recipient mobile communication device; and
        transmit the categorised text string to the supervisory mobile communication device and display an alert of the categorised text string using the supervisory mobile communication device and wherein the supervisory mobile communication device is further configured to:
            transmit a message associated with the alert to the supervised mobile communication device, and
            identify another supervisory mobile communication device associated with the recipient mobile communication device and transmit a message associated with the alert to the other supervisory mobile communication device.

2. The system as claimed in claim 1, wherein not processing input of the categorised text string comprises deleting the categorised text string from a text input field.

3. The system as claimed in claim 2, wherein the keyboard is configured to operate a delete key input a number of times according to a character length of at least one of the message text and categorised text string.

4. The system as claimed in claim 1, wherein the virtual keyboard buffers the text in a buffer and wherein:
    not processing input of the categorised text string comprises deleting the categorised text string from the buffer; and
    processing input of the categorised text string comprises flushing the categorised text string from the buffer to a text input field.

5. The system as claimed in claim 1, wherein the system comprises a keyword definition file and wherein text analysis comprises matching the text against keywords in the database.

6. The system as claimed in claim 5, wherein the keywords include wildcard characters.

7. The system as claimed in claim 5, wherein the keyword definition file is stored in memory by the mobile communication device.

8. The system as claimed in claim 7, wherein the mobile communication device periodically downloads updated versions of the categorised text string database.

9. The system as claimed in claim 8, wherein the system is configured to receive keywords from the supervisory mobile communication device and update the keyword definition file accordingly.

10. The system as claimed in claim 1, wherein the supervised mobile communication device is configured to perform less computationally intensive categorised text string identification and to transmit the message text to a server for more computationally intensive categorised text string identification.

11. The system as claimed in claim 1, wherein the message includes the categorised text string.

12. The system as claimed in claim 1, wherein the system is configured for querying a database of a server using an identifier associated with the recipient mobile communication device for another supervisory user account associated with the other supervisory mobile communication device.

13. The system as claimed in claim 1, wherein the system is configured for automatically inputting and transmitting an initial message to the recipient mobile communication device when initiating messaging.

14. The system as claimed in claim 13, wherein the virtual keyboard is configured for detecting an opening of a messaging interface and inputting and transmitting the initial message.

15. The system as claimed in claim 1, wherein the system is configured for requesting verification information from the recipient mobile communication device.

16. The system as claimed in claim 15, wherein, where the recipient mobile communication device also has the virtual keyboard installed thereon, the virtual keyboard of the recipient mobile communication device requests access to a camera device of the recipient mobile communication device to capture image data which is transmitted to the supervised mobile communication device.

17. The system as claimed in claim 16, wherein the system is configured to inhibit transmission of messages prior receipt of the image data.

18. The system as claimed in claim 16, wherein the system employs facial recognition to verify that the image data comprises a facial image therein.

19. The system as claimed in claim 1, wherein the virtual keyboard is configured to attach audio and/or video file attachments and wherein the system uses text-to-speech recognition to convert audio from the attachments to recognised text and further analyse the recognised text to identify the categorised text strings.

20. The system as claimed in claim 1, wherein the virtual keyboard is configurable in a disabled mode wherein the keyboard does not accept input.

21. The system as claimed in claim 20, wherein the virtual keyboard is configurable in the disabled mode during certain time periods.

22. The system as claimed in claim 21, wherein the certain time periods are configurable using the supervisory mobile communication device.

23. The system as claimed in claim 1, wherein the system is configured for inhibiting transmission of the message text prior analysis thereof.

24. The system as claimed in claim 23, wherein the supervised mobile communication device is configured to transmit the message text to a server and wherein the supervised mobile communication device is configured for inhibiting transmission of the message text prior analysis thereof by the server.

25. An electronic message content intercepting system comprising:
a virtual keyboard installed by an operating system of a supervised mobile communication device to process keypresses for a plurality of software applications executed by the supervised mobile communication device,
wherein the supervised mobile communication device is associated with a supervised user account and wherein the system further comprises a supervisory mobile communication device associated with a supervisory user account, and the supervised user account is associated with the supervisory user account, wherein the system is configured to:
analyse message text input via the keyboard to identify categorised text strings,
display a user interface notification prompt when identifying a categorised text string, the prompt having approval and disapproval inputs; and
responsive to the disapproval input: not process input of the categorised text string so that the categorised text string is not transmitted to a recipient mobile communication device; or
responsive to the approval input:
process input of the categorised text string so that the categorised text string is transmitted to the recipient mobile communication device; and
transmit the categorised text string to the supervisory mobile communication device and display an alert of the categorised text string using the supervisory mobile communication device, wherein:
the system is configured to request verification information from the recipient mobile communication device, and
the recipient mobile communication device also has the virtual keyboard installed thereon, the virtual keyboard of the recipient mobile communication device requests access to a camera device of the recipient mobile communication device to capture image data which is transmitted to the supervised mobile communication device.

26. An electronic message content intercepting system comprising:
a virtual keyboard installed by an operating system of a supervised mobile communication device to process keypresses for a plurality of software applications executed by the supervised mobile communication device,
wherein the supervised mobile communication device is associated with a supervised user account and wherein the system further comprises a supervisory mobile communication device associated with a supervisory user account, and the supervised user account is associated with the supervisory user account, wherein the system is configured to
analyse message text input via the keyboard to identify categorised text strings,
display a user interface notification prompt when identifying a categorised text string, the prompt having approval and disapproval inputs; and
responsive to the disapproval input: not process input of the categorised text string so that the categorised text string is not transmitted to a recipient mobile communication device; or
responsive to the approval input:
process input of the categorised text string so that the categorised text string is transmitted to the recipient mobile communication device; and
transmit the categorised text string to the supervisory mobile communication device and display an alert of the categorised text string using the supervisory mobile communication device, wherein:
the system is configured for inhibiting transmission of the message text prior analysis thereof, and
the supervised mobile communication device is configured to transmit the message text to a server and wherein the supervised mobile communication device is configured for inhibiting transmission of the message text prior analysis thereof by the server.

\* \* \* \* \*